United States Patent
Krauss

(10) Patent No.: US 9,311,217 B2
(45) Date of Patent: *Apr. 12, 2016

(54) ANALYZING COMPUTER PROGRAMS TO IDENTIFY ERRORS

(71) Applicant: GLOBALFOUNDRIES INC., Grand Cayman, KY (US)

(72) Inventor: Kirk J. Krauss, Los Gatos, CA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/754,013

(22) Filed: Jun. 29, 2015

(65) Prior Publication Data

US 2015/0301922 A1     Oct. 22, 2015

Related U.S. Application Data

(63) Continuation of application No. 12/636,057, filed on Dec. 11, 2009, now Pat. No. 9,098,616.

(51) Int. Cl.
*G06F 11/36* (2006.01)
*G06F 9/44* (2006.01)

(52) U.S. Cl.
CPC .......... *G06F 11/3612* (2013.01); *G06F 11/362* (2013.01); *G06F 11/3604* (2013.01); *G06F 11/3624* (2013.01); *G06F 11/3644* (2013.01); *G06F 8/75* (2013.01)

(58) Field of Classification Search
CPC ............ G06F 11/3604; G06F 11/3612; G06F 21/577; G06F 21/562
See application file for complete search history.

(56) References Cited

U.S. PATENT DOCUMENTS

| 7,284,274 B1* | 10/2007 | Walls ........................ G06F 8/70 726/22 |
| 2007/0288899 A1 | 12/2007 | Fanning et al. |
| 2008/0229028 A1* | 9/2008 | Cascaval ............... G06F 8/4442 711/141 |
| 2011/0145650 A1 | 6/2011 | Krauss |

OTHER PUBLICATIONS

IBM, "Identifying potentially expensive paths not taken in a runtime analysis call graph," [online] IP.com Prior Art Database, Disclosure No. IPCOM000180338D, Mar. 6, 2009, 4 pg.
U.S. Appl. No. 12/636,057, Non-Final Office Action, Dec. 9, 2010, 11 pg.
U.S. Appl. No. 12/636,057, Final Office Action, May 25, 2011, 11 pg.
U.S. Appl. No. 12/636,057, Examiner's Answer, Feb. 23, 2012, 16 pg.
U.S. Appl. No. 12/636,057, Decision on Appeal, Mar. 5, 2015, 8 pg.
U.S. Appl. No. 12/636,057, Notice of Allowance, Jun. 5, 2015, 7 pg.

* cited by examiner

*Primary Examiner* — Jigar Patel
(74) *Attorney, Agent, or Firm* — Anthony Canale; Hoffman Warnick LLC

(57) ABSTRACT

A method of analyzing a computer program under test (CPUT) using a system comprising a processor and a memory can include performing, by the processor, static analysis upon the CPUT and runtime analysis upon at least a portion of the CPUT. A static analysis result and a runtime analysis result can be stored within the memory. Portions of the CPUT analyzed by static analysis and not by runtime analysis can be determined as candidate portions of the CPUT. The candidate portions of the CPUT can be output.

18 Claims, 4 Drawing Sheets

ANALYZING COMPUTER PROGRAMS TO IDENTIFY ERRORS

CROSS-REFERENCE TO RELATED APPLICATIONS

This application is a Continuation of U.S. application Ser. No. 12/636,057, filed on Dec. 11, 2009.

BACKGROUND

The embodiments disclosed within this specification relate to analyzing computer programs to identify errors. Analysis tools are commonly used in software development to evaluate the behavior of computer programs. A typical analysis tool can be considered to be a member of one of two different categories of analysis tools. These two categories are static analysis and runtime (or dynamic) analysis. In general, runtime analysis refers to the practice of understanding computer program behavior using data collected during execution of a computer program. To this end, runtime analysis can detect a wide variety of errors and generates relatively few false positive reports compared to static analysis. Runtime analysis, however, does not evaluate the entirety of a computer program. Rather, runtime analysis typically analyzes only those portions of the computer program that are actually executed during testing.

Static analysis refers to the practice of analyzing a computer program without actually executing the computer program. In this regard, static analysis tools are capable of analyzing all portions of the computer program since the analysis is not dependent upon execution of the computer program. In lieu of execution, static analysis tools utilize heuristics to analyze the computer program. The heuristics, while attempting to approximate runtime behavior, cannot precisely model true runtime behavior. As such, static analysis tools typically generate more false positives than runtime analysis.

BRIEF SUMMARY OF THE INVENTION

The embodiments disclosed within this specification relate to analyzing computer programs to identify errors. One embodiment of the present invention can include a method of analyzing a computer program under test (CPUT) using a system comprising a processor and a memory. The system can include performing, by the processor, static analysis upon the CPUT and runtime analysis upon at least a portion of the CPUT and storing a static analysis result and a runtime analysis result in the memory. Portions of the CPUT analyzed by the static analysis and not by the runtime analysis can be determined as candidate portions of the CPUT. The candidate portions of the CPUT can be output.

Another embodiment of the present invention can include a method of analyzing a CPUT using a system comprising a processor and a memory. The method can include performing, by the processor, instrumentation of the CPUT and concurrently performing static analysis upon the CPUT generating an instrumented CPUT and adding at least one data section to a module of the instrumented CPUT. The method further can include storing a static analysis result within each added data section of the instrumented CPUT, loading the instrumented modules into the memory, and executing the instrumented CPUT performing runtime analysis upon at least a portion of the instrumented CPUT. Portions of the CPUT analyzed by static analysis and not by runtime analysis can be determined as candidate portions of the CPUT. The candidate portions of the CPUT can be output.

Another embodiment of the present invention can include a system comprising a memory storing program code and a processor coupled to the memory and executing the program code. The processor, by executing the program code, can be configured to perform a method of analyzing a CPUT comprising performing static analysis upon the CPUT and runtime analysis upon at least a portion of the CPUT and storing a static analysis result and a runtime analysis result in the memory. The processor further can be configured to determine portions of the CPUT analyzed by static analysis and not by runtime analysis as candidate portions of the CPUT and output the candidate portions of the CPUT.

Another embodiment of the present invention can include a computer program product for testing a CPUT comprising a computer readable storage medium having computer readable program code stored thereon that, when executed by a system comprising a processor and a memory, causes the system to perform executable operations. The executable operations can identify errors within a CPUT, for example. The computer readable storage medium can include computer readable program code configured to perform static analysis upon the CPUT and runtime analysis upon at least a portion of the CPUT, computer readable program code configured to store a static analysis result and a runtime analysis result in the memory, and computer readable program code configured to determine portions of the CPUT analyzed by static analysis and not by runtime analysis as candidate portions of the CPUT. The computer readable storage further can include computer readable program code configured to output the candidate portions of the CPUT.

DETAILED DESCRIPTION OF THE INVENTION

Figure 1:
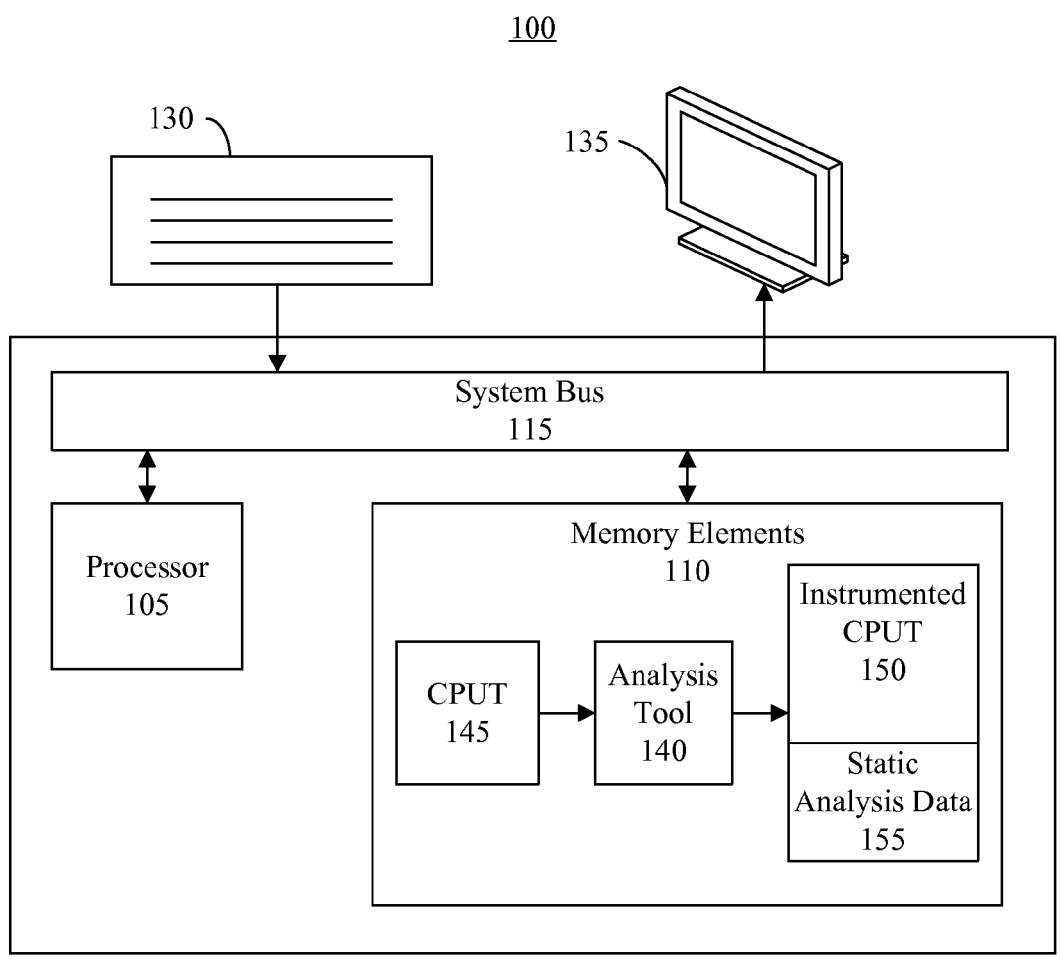
FIG. 1 is a first block diagram illustrating a system for analyzing a computer program in accordance with one embodiment of the present invention.

As will be appreciated by one skilled in the art, aspects of the present invention can be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The embodiments disclosed within this specification relate to computer program analysis and, more particularly, to identifying errors within computer programs. In accordance with the inventive arrangements disclosed within this specification, static analysis can be used in combination with runtime analysis to identify those portions of the computer program undergoing testing that contain error conditions and/or merit further testing. Further, the embodiments disclosed herein can be utilized to indicate which detected error conditions are likely false positives that do not merit further testing or analysis.

FIG. 1 is a first block diagram illustrating a system 100 for analyzing a computer program under test (CPUT) in accordance with one embodiment of the present invention. System 100 can include at least one processor 105 coupled to memory elements 110 through a system bus 115. As such, system 100 can store program code within memory elements 110. Processor 105 can execute the program code accessed from memory elements 110 via system bus 115. In one aspect, for example, system 100 can be implemented as a computer that is suitable for storing and/or executing program code. It should be appreciated, however, that system 100 can be implemented in the form of any system comprising a processor and memory that is capable of performing the functions described within this specification.

Memory elements 110 can include one or more physical memory devices such as, for example, local memory and one or more bulk storage devices (not shown). Local memory can refer to RAM or other non-persistent memory device(s) generally used during actual execution of the program code. Bulk storage device(s) can be implemented as a hard drive or other persistent data storage device. System 100 also can include one or more cache memories (not shown) that provide temporary storage of at least some program code in order to reduce the number of times program code must be retrieved from the bulk storage device during execution.

Input/output (I/O) devices such as a keyboard 130, a display 135, and a pointing device (not shown) optionally can be coupled to system 100. The I/O devices can be coupled to system 100 either directly or through intervening I/O controllers. Network adapters also can be coupled to system 100 to enable system 100 to become coupled to other systems, computer systems, remote printers, and/or remote storage devices through intervening private or public networks. Modems, cable modems, and Ethernet cards are examples of different types of network adapters that can be used with system 100.

As pictured in FIG. 1, memory elements 110 can store an analysis tool 140. Analysis tool 140, being implemented in the form of executable program code, can be executed by processor 105, and thus, system 100. Analysis tool 140, when executed by processor 105 of system 100, causes system 100, or processor 105, to perform the different operations described within this specification regarding a CPUT such as CPUT 145 and/or instrumented CPUT 150.

In operation, system 100 can load and store a CPUT 145 within memory elements 110. Processor 105, executing analysis tool 140, can instrument CPUT 145 and output instrumented CPUT 150. As used herein, "outputting" and/or "output" can mean storing user-consumable data in memory elements 110, e.g., writing to a file stored in memory elements 110, writing to display 135 or other peripheral output device, sending or transmitting to another system, exporting, or the like. As used herein, the term "instrumenting" or "instrument" refers to the process of adding or inserting diagnostic code to an existing computer program, e.g., CPUT 145. The diagnostic code can be inserted into CPUT 145 to create instrumented CPUT 150. CPUT 145 can be instrumented in any of a variety of different ways including, for example, inserting diagnostic program code into the source code of CPUT 145 which would require compilation, inserting diagnostic program code into the object code of CPUT 145, e.g., after compilation, or the like.

The diagnostic program code inserted into instrumented CPUT 150 can perform analysis functions when instrumented CPUT 150 is executed. For example, the diagnostic program code can perform functions such as detecting entries into functions, exits from functions, and logging and/or monitoring computing resource usage (e.g., detection of memory allocations and de-allocations) by instrumented CPUT 150 during execution. Additional diagnostic program code functions can include runtime error checking including, but not limited to, detecting memory leaks, detecting reads of uninitialized memory, detecting invalid memory writes (e.g., attempted writes to read-only or prohibited memory locations), detecting an access (e.g., a read and/or a write) to a memory location that is beyond the boundaries of a block of memory, accessing free memory that is not allocated and available for use, etc.

The diagnostic program code inserted into instrumented CPUT 150 also can perform code coverage runtime analysis functions. Code coverage analysis, in general, refers to the process of observing and recording which portions of program code of instrumented CPUT 150 were executed during runtime and, thus, at least indirectly by virtue of determining those that executed, those that were not executed. Code coverage analysis and runtime error analysis can function on any of a variety of different levels of granularity. For example, each type of analysis can operate on the module level in reference to entire segments of program code, on the function level in terms of a method or the like, at the object level, on a line of code basis, e.g., source code, or on a basic block basis. A "basic block," as used within this specification, refers to a portion of program code that is free of branches such as conditional instructions. Accordingly, once an entry into a basic block is detected, apart from terminating execution of instrumented CPUT 150, analysis tool 140 can determine, with certainty, that the entire sequence of instructions within the basic block that was entered will execute. Thus, the phrase "portion of program code" or "portion of the CPUT" can refer to any of the listed levels of granularity.

In one embodiment, during, and concurrent with, instrumentation of CPUT 145, analysis tool 140 can perform static analysis upon CPUT 145. As discussed, static analysis does not require execution of CPUT 145. In general, analysis tool 140 can perform a heuristic analysis of CPUT 145 and examine the various execution paths that exist within CPUT 145. For example, analysis tool 140, in performing static analysis, can perform entry point analysis and data flow analysis which involves the programmatic disassembling and recognition of instruction sequences defining execution paths through CPUT 145. Other static analysis functions can include, but are not limited to, detecting array bound errors, memory leaks, and the like. For example, in performing static analysis, analysis tool 140 can determine that were a given path through CPUT 145 executed, a potential memory leak exists since requested memory is not released within that path. As noted, however, while static analysis can exhaustively analyze CPUT 145, static analysis can generate false positives. For example, static analysis performed by analysis tool 140 can identify execution paths through CPUT 145 that exist theoretically, but that do not occur in practice.

It should be appreciated that while static analysis is described as being performed during instrumentation, static analysis can be performed at any of a variety of different times without limitation. For example, static analysis can be performed upon CPUT 145 during compilation, after compilation, or during interpretation if CPUT 145 is an interpreted computer program. Static analysis also can be performed prior to or after instrumentation.

Upon completion of static analysis, and prior to performing runtime analysis, system 100 can output a result of the static analysis in the form of static analysis data 155. In one embodiment, static analysis data 155 can be stored within an added data section, this added data section can be included in each executable module of the instrumented CPUT 150. In another embodiment, static analysis data 155 can be stored independently of instrumented CPUT 150. In that case, static analysis data 155 can be loaded into memory elements 110, a different memory within system 100, or in a memory that is external to system 100. In any case, when stored independently of instrumented CPUT 150, system 100 can store a reference or pointer to the location where static analysis data 155 is stored to allow subsequent access and/or recall of static analysis data 155.

Within this specification, static analysis is described in terms of being performed upon CPUT 145. It should be appreciated, however, that when static analysis is performed during instrumentation, system 100 can perform static analysis upon CPUT 145, e.g., prior to, or during, instrumentation, upon some intermediate form of CPUT 145 prior to creation or generation of instrumented CPUT 150, or subsequent to instrumentation, e.g., upon instrumented CPUT 150. Accordingly, for purposes of discussion and clarity, references to performing static analysis will be made largely to CPUT 145. Such references, however, are not intended to preclude performing static analysis upon instrumented CPUT 150 or any intermediate form of CPUT 145 that is generated in the process of creating instrumented CPUT 150. In this regard, reference to the CPUT can refer to the CPUT pre-instrumentation or post-instrumentation unless the context indicates otherwise.

Figure 2:
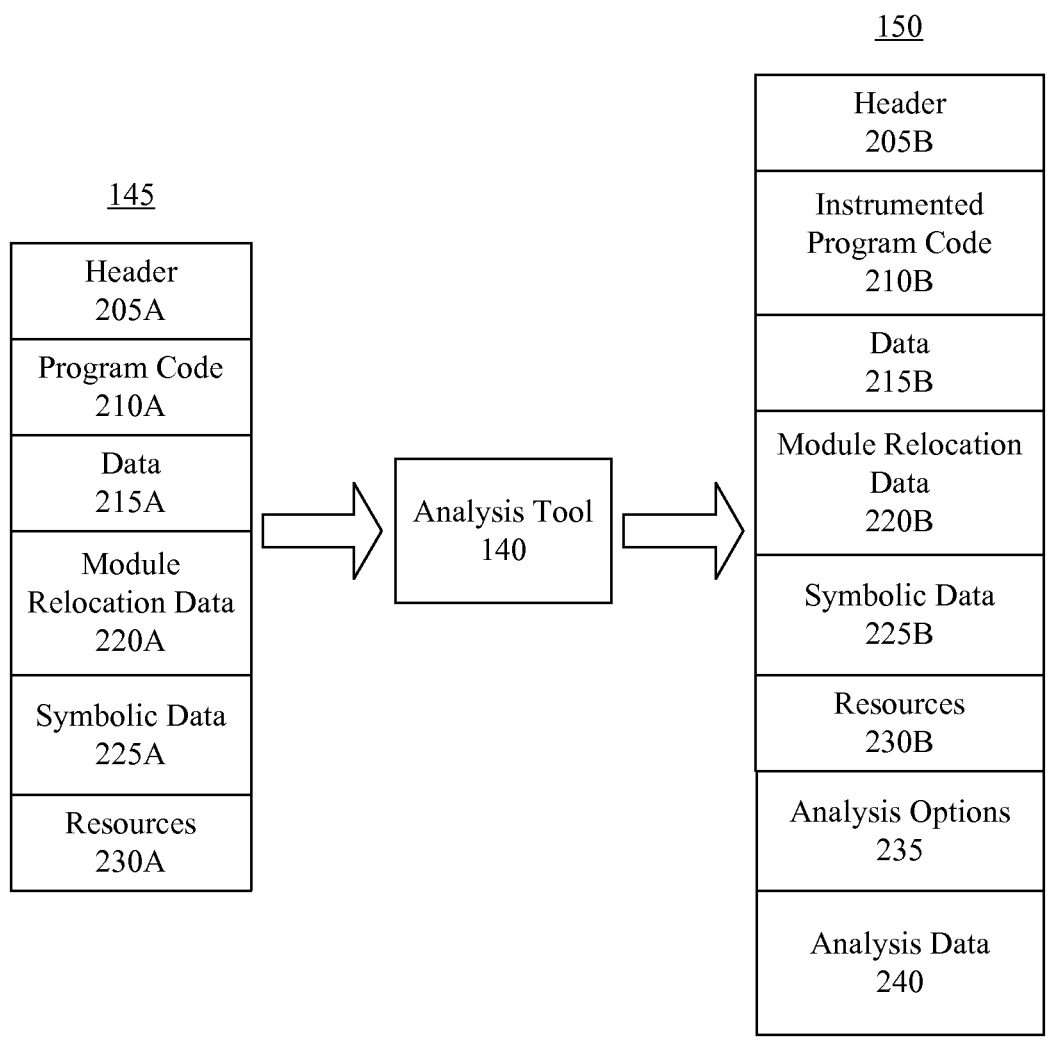
FIG. 2 is a second block diagram illustrating instrumentation of a computer program in accordance with another embodiment of the present invention.

FIG. 2 is a second block diagram illustrating instrumentation of a computer program in accordance with another embodiment of the present invention. More particularly, FIG. 2 illustrates processing performed by analysis tool 140 upon CPUT 145 as illustrated and described with reference to FIG. 1. FIG. 2 illustrates structural changes to CPUT 145, as embodied in instrumented CPUT 150, as a consequence of instrumentation. Within FIG. 2, both CPUT 145 and instrumented CPUT 150 are illustrated as executable objects. For example, both CPUT 145 and instrumented CPUT 150 are depicted as single executable modules using the Portable Executable (PE) file format commonly used for executable programs, object code, and dynamically linked libraries (DLLs) within a system executing a Windows®-based operating system.

The embodiments disclosed herein, however, are not intended to be limited solely to the PE format. Any of a variety of different formats, whether the Executable and Linkable Format (ELF) commonly used by a system executing a Unix-based operating system, or the like, can be used without limitation. The example presented in FIG. 2 is intended to illustrate aspects of the embodiments in a non-limiting manner. Further, though CPUT 145 and instrumented CPUT 150 are depicted in binary format, it should be appreciated that the embodiments disclosed herein can be applied to embodiments that utilize source code instrumentation or instrumentation of interpretable program code as opposed to instrumentation of object code.

As shown, FIG. 2 illustrates CPUT 145 including a header section 205A, a program code section 210A, a data section 215A, a module relocation data section 220A, a symbolic data section 225A, and a resources section 230A. In general, header section 205A can identify CPUT 145 as an executable object and further can indicate the type of format to which CPUT 145 adheres, e.g., ELF, PE, or the like. Program code section 210A can include the executable program code, e.g., actual executable instructions. Data section 215A can include static data utilized by CPUT 145 during execution.

Module relocation data section 220A can include data that is unrelated to the static data of data section 215A, but which indicates where different modules of CPUT 145 are located in memory in terms of a memory offset, for example, when stored in memory for execution. It should be appreciated that module relocation data section 220A is not necessary for purposes of execution of CPUT 145, but is utilized for purposes of debugging and the like to correlate memory locations with different portions of CPUT 145. Similarly, symbolic data section 225A can include correlations between portions of CPUT 145, as indicated by memory location, with names of those portions that can be exported, largely for purposes of facilitating calls between modules and also for debugging purposes. Resources section 230A can specify information that can identify internationalized text and widgets that can be presented upon displays as part of, or within, a graphical user interface (GUI) based application, for example, among other items of information.

Analysis tool 140 can process CPUT 145 and generate instrumented CPUT 150 through, at least in part, insertion of diagnostic program code. As noted, analysis tool 140 also can perform static analysis upon CPUT 145 during instrumentation. As shown, instrumented CPUT 150 can include a header section 205B, an instrumented program code section 210B, a data section 215B, a module relocation data section 220B, a symbolic data section 225B, a resources section 230B, an analysis options section 235, and an analysis data section 240.

Header section 205B can include data, largely as described with reference to header section 205A of CPUT 145, that identifies instrumented CPUT 150 as an executable object. Instrumented program code section 210B can include instrumented program code, e.g., program code from CPUT 145 with diagnostic program code inserted therein. Data section 215B can store largely static data as described with reference to data section 215A. Module relocation data section 220B and symbolic data section 225B will differ from module relocation data section 220A and symbolic data section 225A of CPUT 145 respectively as a consequence of the instrumentation process. For example, instrumented program code section 210B includes additional calls to functions and/or modules to detect errors and determine code coverage at runtime of instrumented CPUT 150. Thus, due to the inserted diagnostic code, the memory offsets and symbolic data within module relocation data section 220B and symbolic data section 225B will differ from module relocation data section 220A and symbolic data section 225A respectively. Resources section 230B will be substantially similar to resources section 230A.

As shown, instrumented CPUT 150 can include two sections not included within CPUT 145. Analysis options section 235 can include one or more analysis options that control how the diagnostic program code within instrumented program code section 210B will function during runtime as well as, at least optionally, the type and content of reports and output generated as described within this specification. The analysis options contained within analysis options section 235 can include one or more user specified analysis options, for example.

Analysis data section 240 can include the result of static analysis, e.g., static analysis data 155 of FIG. 1, as performed and generated by analysis tool 140 during the instrumentation process. For example, static analysis data can include warnings, errors, or the like determined from static analysis. While static analysis data 155 need not be stored within analysis data section 240, doing so allows static analysis data 155 to be paired with the particular CPUT, in this case instrumented CPUT 150, from which the data was generated. In this regard, confusion as to which version of a computer program static analysis data 155 corresponds is eliminated. Moreover, static analysis data 155 is available to runtime analysis functions when runtime analysis is performed.

In one embodiment, static analysis data 155 can be stored in the form of a directed graph. For example, error reports can be associated with each function, method, module, line of code, basic block, or the like, to which such an error report corresponds. The stored static analysis data 155 may or may not be displayed to a user prior to runtime of instrumented CPUT 150. Making static analysis data 155 available prior to runtime analysis, however, can allow the user or system to target those areas of instrumented CPUT 150 for runtime analysis that were shown, by static analysis, to include at least a minimum threshold number of error conditions. Accordingly, analysis tool 140 can target those areas with high irregularities, e.g., identified error conditions, for runtime analysis.

It should be appreciated that a directed graph is presented as one example of a format that can be used for storing static analysis data 155. Other formats can be used without limitation. Further, the particular order in which sections of CPUT 145 and instrumented CPUT 150 are presented is for purposes of illustration only. The particular order of the various sections can vary and, for example, may be determined, at least in part, according to the particular compiler that is used.

Figure 3:
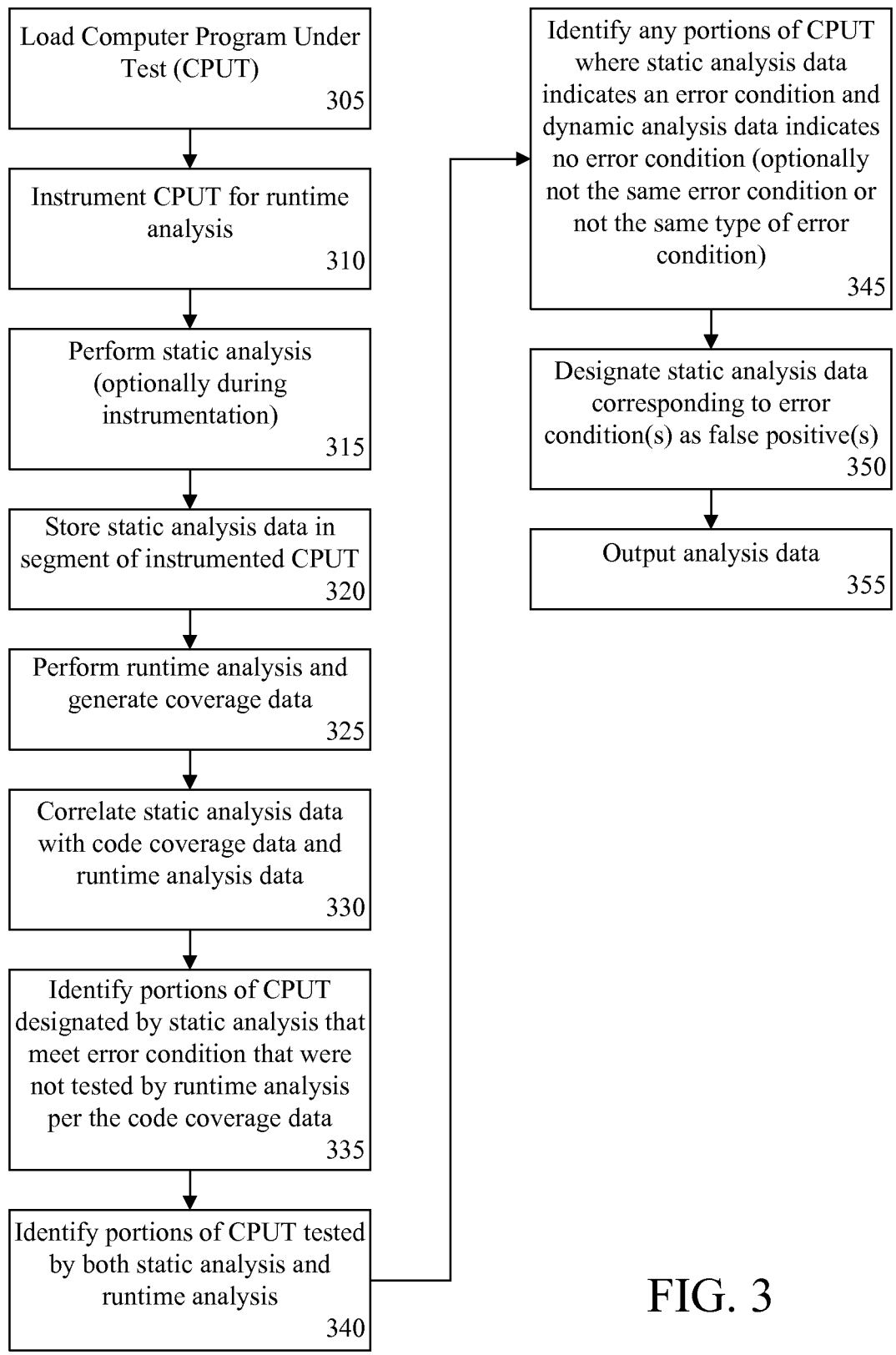
FIG. 3 is a flow chart illustrating a method of analyzing a computer program in accordance with another embodiment of the present invention.

FIG. 3 is a flow chart illustrating a method 300 of analyzing a CPUT in accordance with another embodiment of the present invention. Method 300 can be performed by a system as described with reference to FIGS. 1 and 2. Accordingly, method 300 can begin in step 305 where the system loads the CPUT into memory for processing.

In step 310, the system can instrument the CPUT with diagnostic code for performing runtime analysis. In step 315, the system can perform static analysis upon the CPUT. In one embodiment, the static analysis performed by the system can be performed concurrently with the instrumentation process of step 310. In step 320, the static analysis data that is generated by the system in performing static analysis upon the CPUT can be stored in a data section that is appended, or added, to the instrumented CPUT. As noted, however, the static analysis data can be stored in any of a variety of different locations and need not be appended or otherwise added as part of the instrumented CPUT as an additional section.

In step 325, the system can execute the instrumented CPUT, thereby performing runtime analysis on the instrumented CPUT through execution of the diagnostic program code embedded therein. While performing runtime analysis, the system can generate runtime analysis data and code coverage data. Thus, the system, in executing the instrumented CPUT, can create a record of those portions of the instrumented CPUT that were executed, and thus, runtime tested. As discussed, the granularity of the different varieties of generated data can vary.

In one embodiment, the generated runtime error data and the coverage data can be stored in the form of a directed graph. In one embodiment, runtime analysis data and/or code coverage data can be stored in the data segment added to the instrumented CPUT within which static analysis data is stored. As noted with respect to static analysis data, however, the runtime error data and the code coverage data can be stored elsewhere.

Runtime error data can be stored in one directed graph and coverage data can be stored in another directed graph. The runtime error data graph and the code coverage data graph further can be independent of the static analysis data graph. Alternatively, the different varieties of data, e.g., runtime error, static, and coverage, can be integrated or merged into a single, unified graph. In any case, the directed graph built for runtime error analysis and/or coverage analysis can include symbolic information for the particular unit, e.g., function, line of code, etc., and the module within which that portion resides within the instrumented CPUT. It should be appreciated that by using directed graphs of similar structure, the same program code can be used to traverse each different type of directed graph. Still, as noted, any of a variety of different data structures can be used to store analysis data, whether static, runtime, or coverage.

In step 330, the runtime error data and the code coverage data can be correlated with the static analysis data. For example, the code coverage data can be compared with the static analysis data to identify portions of the instrumented CPUT that were subjected to both static analysis and runtime error analysis and portions of the instrumented CPUT that were subjected only to static analysis and not runtime error analysis.

Though described as occurring subsequent to generation of the runtime error and/or code coverage data, in another embodiment, when coverage data is generated, each portion of the instrumented CPUT, depending upon the granularity being used, can be matched to a corresponding location or place within a directed graph stored or created during the instrumentation phase. Such directed graphs can be module specific, e.g., one graph per module or portion of program code corresponding to the level of granularity specified. In one aspect, a depth-first search can be performed through the relevant graphs associated with each module. The search can proceed along all or part of the call chain leading to the current location, e.g., the location being executed during runtime analysis. In one aspect, depending upon the data to be output to the user, the search can be performed only for portions of the instrumented CPUT that were not tested during runtime. Searching only portions of the instrumented CPUT not tested during runtime can result in reporting only those error conditions found by static analysis for portions of the instrumented CPUT not tested during runtime analysis. In another aspect, the search can be performed for all portions of the instrumented CPUT to provide combined results.

In step 335, the system can identify portions of the instrumented CPUT that, based upon static analysis data, meet one or more error conditions and also were not subjected to runtime analysis. Examples of error conditions can include, but are not limited to, a portion of the CPUT including a minimum number or errors as determined by static analysis, e.g., a single error or more than a single error, a warning in reference to a potential source of one or more errors, a portion of the CPUT including at least one or a minimum number of a particular type of error as determined by static analysis, or any combination thereof. Other examples of error conditions can include time-based errors in which the amount of time determined for a given portion of program code to execute as determined by static analysis differs by more than a threshold amount of time, e.g., absolute time or percentage, as compared to actual time to execute as determined by runtime analysis. In addition to the above, the system can further report error conditions based on the severity of the identified error. As such, errors identified as severe can be included in the report, whereas errors identified as less severe may not be reported. For example, errors identified as being likely to cause an immediate crash (i.e. code containing a jump to an uncommitted memory) may be classified as severe, and thus be included in the report. Alternatively, errors identified as being less catastrophic (for instance, when a 32-bit structure is read, but only part of it is used, and the rest is left uninitialized) can be intentionally left in the code to improve performance. As stated above, these less catastrophic error types may be automatically identified by the system, or may be identified by the user through a filtering process so as to remain in the code without being reported. Portions of the CPUT, or instrumented CPUT, as the case may be, that meet the error condition with regard to static analysis but that were not tested using runtime analysis are portions of the CPUT that merit runtime testing. Such portions of the instrumented CPUT may include errors that arise during runtime analysis.

In step 340, the system can identify those portions of the instrumented CPUT that were tested using both static analysis and runtime analysis. The system can make the determination via a search of the static analysis data and the code coverage data, for example. Accordingly, both static analysis data and runtime analysis data exist for such portions of the instrumented CPUT. In step 345, the system can determine and identify any portion of the CPUT for which static analysis indicated at least one error condition and runtime analysis indicated no errors, or at least not the same error condition that was detected by static analysis. For example, the system can determine whether the same error condition was detected by both static analysis and runtime analysis for a given portion of program code, whether a same type of error condition was detected by both forms of analysis for the same portion of program code, or the like. In step 350, any error conditions detected by static analysis that were not detected by runtime analysis for a given portion of the CPUT can be designated as false positives by the system.

As discussed, the level of granularity in identifying portions of the CPUT, comparing results of static analysis and runtime analysis, and in presenting such results can exist at any of a variety of levels. For example, the level of granularity can be set to the module level, the function level, the line of code level, the basic block level, or the like. In any case, in step 360, the system can output analysis data. The analysis data can include, for example, a list of portions of the CPUT that were identified in step 335, optionally a listing of false positives as determined in steps 340 and 345, or the like. The analysis data can be displayed in the form of a list, a report, a call flow graph, or the like.

Figure 4:
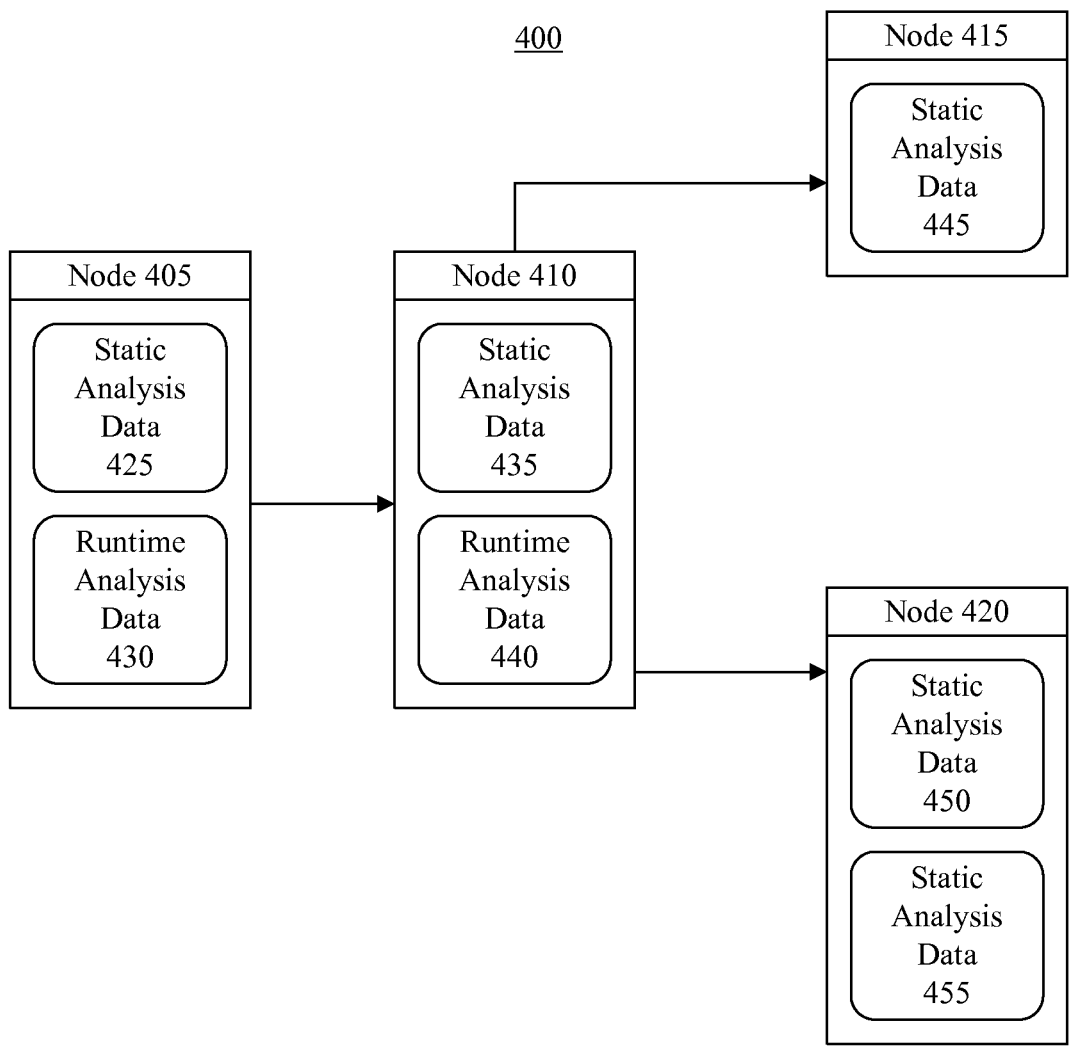
FIG. 4 is a third block diagram illustrating results from analysis of a computer program in accordance with another embodiment of the present invention.

FIG. 4 is block diagram illustrating analysis results of a CPUT in accordance with another embodiment of the present invention. FIG. 4 presents an example of a call flow graph 400 that can be presented to a user, e.g., displayed, by the system described with reference to FIGS. 1-3. Call flow graph 400 illustrates the different results that can be determined as described with reference to FIG. 3. Call flow graph 400 includes a plurality of nodes 405, 410, 415, and 420. In this example, each of nodes 405-420 can represent a function of the CPUT.

As shown, each of nodes 405-420 can indicate whether that node includes static analysis data and/or runtime analysis data. It should be appreciated that each node can include actual data, indications that such data exists, or references to the data if that data exists. For example, node 405 includes both static analysis data 425 and runtime analysis data 430. Accordingly, the function represented by node 405 has been subjected to both static analysis and runtime analysis. It should be appreciated that the runtime analysis data 430 can include actual results of runtime analysis or serve as an indication, e.g., a visual indication, that the function of the instrumented CPUT represented by node 405 was executed per the code coverage data. Similarly, since node 410 includes static analysis data 435 and runtime analysis data 440, the function of the CPUT represented by node 410 has been subjected to both static analysis and runtime analysis. Node 415 includes only static analysis data 445 and, therefore, has not been subjected to runtime analysis 445. Node 420 includes static analysis data 450 and runtime analysis data 455. Accordingly, the function of the CPUT represented by node 420 has been subjected to both runtime analysis and static analysis.

Though each of nodes 405-420 is illustrated as including references or portions indicating whether the function represented by each respective node has been subjected to static analysis or both static and runtime analysis, other visual indicators also can be used. Visual indicators such as shading, bolding, and/or color coding can be used to indicate nodes that, for example, have been subjected to static analysis but not runtime analysis, nodes identified as likely including false positives as described with reference to FIG. 3, nodes that include a minimum number and/or type of error as determined by static analysis but were not tested by runtime analysis, or the like.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of analyzing a computer program under test (CPUT) using a system including a processor and a memory, the method comprising:
   performing, by the processor, static analysis upon the CPUT and runtime analysis upon at least a portion of the CPUT;
   storing a static analysis result and a runtime analysis result in the memory;
   determining portions of the CPUT analyzed by static analysis and not by runtime analysis as candidate portions of the CPUT,
   wherein the determining includes limiting the candidate portions to only portions of the CPUT that include at least one error condition as determined by static analysis; and
   outputting the candidate portions of the CPUT.

2. The method of claim 1, further comprising:
   selecting the at least one error condition to be including a minimum number of errors.

3. The method of claim 1, further comprising:
   selecting the at least one error condition to be including at least one error of a selected type.

4. The method of claim 1, further comprising:
   adding at least one section to a module of the CPUT; and
   storing the static analysis result within the added section.

5. The method of claim 1, further comprising:
   adding at least one section to a module of the CPUT; and
   storing the dynamic analysis result within the added section of the CPUT.

6. The method of claim 1, further comprising:
   performing runtime analysis upon at least one of portion of the CPUT identified as a candidate portion.

7. The method of claim 1, further comprising:
   determining that an error detected within a portion of the CPUT by static analysis that is not detected within the same portion of the CPUT during runtime analysis is a false positive.

8. A system comprising:
   a memory storing program code;
   a processor coupled to the memory and executing the program code, wherein the processor, by executing the program code, is configured to perform a method of analyzing a computer program under test (CPUT) including:
      performing static analysis upon the CPUT and runtime analysis upon at least a portion of the CPUT;
      storing a static analysis result and a runtime analysis result in the memory;

determining portions of the CPUT analyzed by static analysis and not by runtime analysis as candidate portions of the CPUT, wherein the determining includes limiting the candidate portions to only portions of the CPUT that comprise at least one error condition as determined by static analysis; and outputting the candidate portions of the CPUT.

9. The system of claim 8, wherein the processor further is configured to perform a step comprising:

selecting the at least one error condition to be including a minimum number of errors.

10. The system of claim 8, wherein the processor further is configured to perform a step comprising:

selecting the at least one error condition to be including at least one error of a selected type.

11. The system of claim 8, wherein the processor further is configured to perform steps comprising:

adding at least one section to a module of the CPUT; and storing the static analysis result within the added section of the CPUT.

12. The system of claim 8, wherein the processor is further is configured to perform steps comprising:

adding at least one section to a module of the CPUT; and storing the dynamic analysis result within the added section of the CPUT.

13. The system of claim 8, wherein the processor is further configured to perform a step comprising:

determining that an error detected within a portion of the CPUT by static analysis that is not detected within the same portion of the CPUT during runtime analysis is a false positive.

14. A computer program product for testing a computer program under test (CPUT) comprising:

computer readable storage medium having computer readable program code stored thereon that, when executed by a system including a processor and a memory, causes the system to perform executable operations, the computer readable storage medium including:

computer readable program code configured to perform static analysis upon the CPUT and runtime analysis upon at least a portion of the CPUT;

computer readable program code configured to store a static analysis result and a runtime analysis result in the memory;

computer readable program code configured to determine portions of the CPUT analyzed by static analysis and not by runtime analysis as candidate portions of the CPUT, wherein the computer readable program code configured to determine portions of the CPUT analyzed by static analysis and not by runtime analysis as candidate portions of the CPUT includes computer readable program code configured to limit the candidate portions to only portions of the CPUT that include at least one error condition as determined by the static analysis; and computer readable program code configured to output the candidate portions of the CPUT.

15. The computer program product of claim 14, wherein the computer readable storage medium further comprises:

computer readable program code configured to add at least one section to a module of the CPUT; and computer readable program code configured to store the static analysis result within the added section of the CPUT.

16. The computer program product of claim 14, wherein the computer readable storage medium further comprises:

computer readable program code configured to add at least one section to a module of the CPUT; and computer readable program code configured to store the dynamic analysis result within the added section of the CPUT.

17. The computer program product of claim 14, wherein the computer readable storage medium further comprises:

computer readable program code configured to determine that an error detected within a portion of the CPUT by static analysis that is not detected within the same portion of the CPUT during runtime analysis is a false positive.

18. A method of analyzing a computer program under test (CPUT) using a system including a processor and a memory, the method comprising:

performing, by the processor, instrumentation of the CPUT and concurrently performing static analysis upon the CPUT generating an instrumented CPUT;

adding at least one data section to a module of the instrumented CPUT;

storing a static analysis result within the added section of the instrumented CPUT within the memory;

executing the instrumented CPUT performing runtime analysis upon at least a portion of the instrumented CPUT;

determining portions of the CPUT analyzed by static analysis and not by runtime analysis as candidate portions of the CPUT, wherein the determining includes limiting the candidate portions to only portions of the CPUT that include at least one error condition as determined by static analysis; and outputting the candidate portions of the CPUT.

* * * * *